United States Patent
Choi

[11] Patent Number: 6,111,585
[45] Date of Patent: Aug. 29, 2000

[54] TEXTURE MAPPING SYSTEM AND METHOD USING A TEXTURE CACHE FOR MINIMUM CAPACITY AND MINIMUM ACCESS TIME

[75] Inventor: Sang-gil Choi, Yongin, Rep. of Korea

[73] Assignee: Samsung Electronics Co., Ltd., Kyungki-do, Rep. of Korea

[21] Appl. No.: 09/078,809

[22] Filed: May 14, 1998

[30] Foreign Application Priority Data

Sep. 19, 1997 [KR] Rep. of Korea .................. 97-47711

[51] Int. Cl.[7] ............................................. G06F 17/30
[52] U.S. Cl. ..................... 345/430; 345/425; 345/509; 345/513
[58] Field of Search .................................... 345/430, 440, 345/468, 115, 118, 121, 127, 501, 509, 425, 426, 507, 513, 433; 382/154

[56] References Cited

U.S. PATENT DOCUMENTS

| | | | |
|---|---|---|---|
| 4,615,013 | 9/1986 | Yan et al. | 345/430 |
| 5,224,208 | 6/1993 | Miller, Jr. et al. | 345/425 |
| 5,528,751 | 6/1996 | Priem et al. | 345/509 |
| 5,936,632 | 8/1999 | Cunniff et al. | 345/430 |
| 5,953,020 | 9/1999 | Wang et al. | 345/513 |
| 6,009,190 | 12/1999 | Szeliski et al. | 382/154 |

*Primary Examiner*—Mark R Powell
*Assistant Examiner*—Thu-Thao Havan
*Attorney, Agent, or Firm*—Sughrue, Mion, Zinn, Macpeak & Seas, PLLC

[57] ABSTRACT

A texture mapping system and a texture mapping method are provided for generating pixels displayed on a screen by texture mapping. The texture mapping system includes a texture cache for storing texture image data fetched from a frame buffer memory with respect to one scanline, in which the texture cache comprises a column structure composed of a tag region where an image coordinate value (u, v) of the texture image data is stored, a refill line region where the texture image data corresponding to the image coordinate value of the tag region is stored, and an effective bit region indicating whether data of the refill line region is accessed. The texture cache also has a row structure in which the number of rows is the same as the number texture image patch data with respect to an image of a maximum length covering at least one scanline to be texture mapped, to store texture image patch data to be texture mapped. Accordingly, by the texture mapping system including a texture cache and a data loading method of the texture cache, texture memory capacitance of the graphic process chip is reduced to reduce chip cost. Further, data access speed is reduced due to cache hit to rapidly perform texture-mapping.

6 Claims, 3 Drawing Sheets

| FIRST EFFECTIVE BIT 0 | SECOND EFFECTIVE BIT 0 | TAG 0 | REFILL LINE 0 |
|---|---|---|---|
| FIRST EFFECTIVE BIT 1 | SECOND EFFECTIVE BIT 1 | TAG 1 | REFILL LINE 1 |
| . . . | . . . | . . . | . . . |
| FIRST EFFECTIVE BIT 16 | SECOND EFFECTIVE BIT 16 | TAG 16 | REFILL LINE 16 |
| . . . | . . . | . . . | . . . |
| FIRST EFFECTIVE BIT n | SECOND EFFECTIVE BIT n | TAG n | REFILL LINE n |

300　　301　　310　　320

| FIRST EFFECTIVE BIT 0 | SECOND EFFECTIVE BIT 0 | TAG 0 | REFILL LINE 0 |
|---|---|---|---|
| FIRST EFFECTIVE BIT 1 | SECOND EFFECTIVE BIT 1 | TAG 1 | REFILL LINE 1 |
| ⋮ | ⋮ | ⋮ | ⋮ |
| FIRST EFFECTIVE BIT 16 | SECOND EFFECTIVE BIT 16 | TAG 16 | REFILL LINE 16 |
| ⋮ | ⋮ | ⋮ | ⋮ |
| FIRST EFFECTIVE BIT n | SECOND EFFECTIVE BIT n | TAG n | REFILL LINE n |
| 300 | 301 | 310 | 320 |

# TEXTURE MAPPING SYSTEM AND METHOD USING A TEXTURE CACHE FOR MINIMUM CAPACITY AND MINIMUM ACCESS TIME

BACKGROUND OF THE INVENTION

1. Field of the Invention

The present invention relates to a texture mapping system and method, and more particularly, to a texture mapping system and method using a texture cache for minimum capacity and minimum access time.

2. Description of the Related Art

In general, in a three-dimensional (3D) graphics field, most of pixels on a screen are generated by texture mapping, so that performance of the graphics depends on performance of the texture mapping.

FIG. 1 shows an embodiment of a conventional graphic processor for texture mapping. The graphic processor includes a geometry processor 100, a rasterizer 110, a monitor 120 and a frame buffer memory/texture memory 130. The geometry processor 100 calculates changes of geometric information on an object to be rendered as a unit of a polygon, and converts the result to be projected on a screen of the monitor 120. The rasterizer 110 calculates a parameter necessary for rasterization from the projected polygons and generates pixel values in the polygons using the parameter. The frame buffer memory/texture memory 130 for storing intensity data of each pixel forming an image, allots its portion partially acts as a texture memory region for storing texel data to be texture-mapped. In a structure as shown in FIG. 1, a memory bandwidth is narrow, so that a fetch speed of the texel data is undesirably reduced.

To solve the problem, a texture memory for storing image data to be texture-mapped may be provided separately from the frame buffer memory. Accordingly, the memory bandwidth may increase, however, the data fetch speed for access to an external memory is still limited. Also, a memory capable of storing one texture, where one scene may be composed of dozens or hundreds of texture images, may be embedded in the rasterizer. Here, the memory fetch speed increases, however, a memory having capacity as large as the texture image data can be stored is required for the rasterizer.

As described above, in texture mapping, bottleneck problems may occur in fetching the texel, which is data for the texture mapping, from the texture memory. Preferably, the fetch speed of the texel is increased by rapidly fetching data using a texture cache. However, the texture image data is two-dimensional, and each of the objects to be texture-mapped is momentarily changed on the screen by shifting of the eye position. Therefore, the address value to pre-fetch the texel is not predictable.

SUMMARY OF THE INVENTION

To solve the above problems, it is an object of the present invention to provide a texture mapping system including a texture cache for minimizing memory capacity and reducing times of the data access to thereby increase a texture mapping speed, and a texture mapping method.

Accordingly, to achieve the above object, a texture mapping system for generating pixels displayed on a screen by texture mapping, comprising a texture cache for storing texture image data fetched from a frame buffer memory with respect to one scanline, wherein the texture cache comprises a column structure composed of a tag region where an image coordinate value (u, v) of the texture image data is stored, a refill line region where the texture image data corresponding to the image coordinate value of the tag region is stored, and an effective bit region indicating whether data of the refill line region is accessed; and a row structure of the number same as the number texture image patch data with respect to an image of a maximum length covering at least one scanline to be texture-mapped to store texture image patch data to be texture mapped.

Preferably, in the refill line region, capacity of one line is determined by a data compression method and bits per pixel (bpp) indicating color of a texel and transparency thereof, and texel data around the image coordinate is stored in each line.

It is also preferable that the effective bit region is composed of: a first effective bit region for storing data indicating whether texture image patch data of the refill line region is used for previous scanline texture mapping; and a second effective bit region for writing data of whether texture image patch data of the refill line region is used for the current scanline texture mapping, and shifting the stored data to the first effective bit region after the current scanline texture mapping.

To achieve the above object, there is provided a texture mapping method using texture cache for storing texture image data fetched from a frame buffer memory to be texture mapped with respect to one scanline image, comprising the steps of: a) shifting data of a second effective bit region, which indicates whether texture image patch data stored in a corresponding texture cache line is used for previous scanline texture mapping, to a first effective bit region which is another memory in the texture cache and resetting the data of the second effective bit region when texture mapping of a new scanline begins; b) checking whether a tag region for storing an image coordinate (u, v) of texel data to be texture mapped includes an address same as a (u, v) address generated with respect to one image of a current scanline; c) reading texture image data patch around the (u, v) address from the frame memory buffer and storing the texture image data patch in the refill line region where the data of the first effective bit region is reset, when the tag region includes no address same as the (u, v) address generated with respect to one image of a current scanline; d) reading values of the texture image patch data of the corresponding refill line region and setting data of the second effective bit region of the corresponding line when the tag region includes an address same as the (u, v) address generated with respect to one image of the current scanline or after the step c) is performed; and e) completing texture mapping data access of the current scanline when a pixel to be texture mapped is a last pixel of the current scanline, and repeatedly performing the process from the step b) when not.

To accomplish the above object, there is provided a texture mapping system comprising: a geometry processor for calculating changes of geometric information on an object to be rendered in a polygon unit, and converting the result to be projected on a screen of a monitor; a frame buffer memory for storing data with respect to intensity values of each pixel forming an image; a texture cache including a column structure composed of a tag region where an image coordinate value (u, v) of the texture image data fetched from the frame buffer memory is stored during texture mapping with respect to an image covering one scanline, a refill line region where the texture image data corresponding to the image coordinate value of the tag region is stored, and an effective bit region indicating whether data of the refill line region is accessed and a row structure of the number same as the number texture image patch data with respect to an image of a maximum length covering at least one scanline to be texture-mapped for storing texture image patch data to be texture mapped; and a rasterizer for performing rasterization using a signal generated by the geometry processor and the texture image patch data read from the texture cache.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENTS

Figure 1:
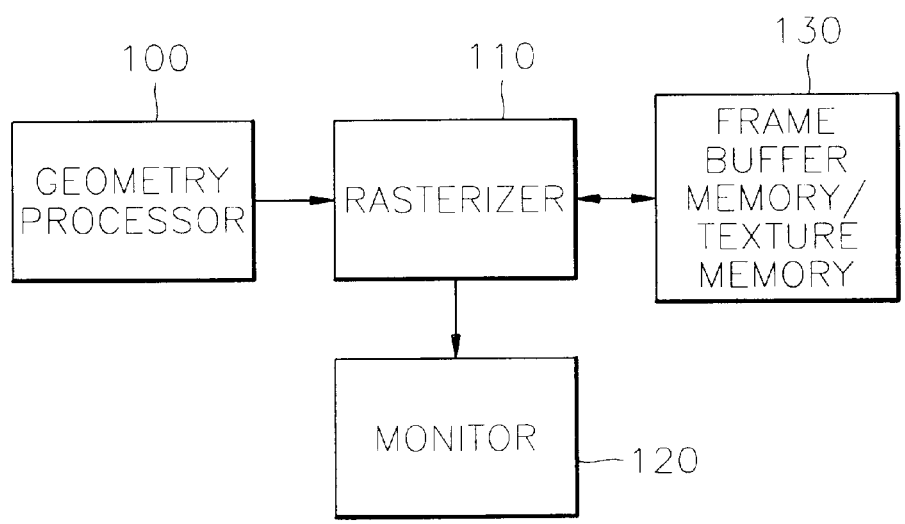
FIG. 1 shows an embodiment of a conventional graphic processor.
Figure 2:
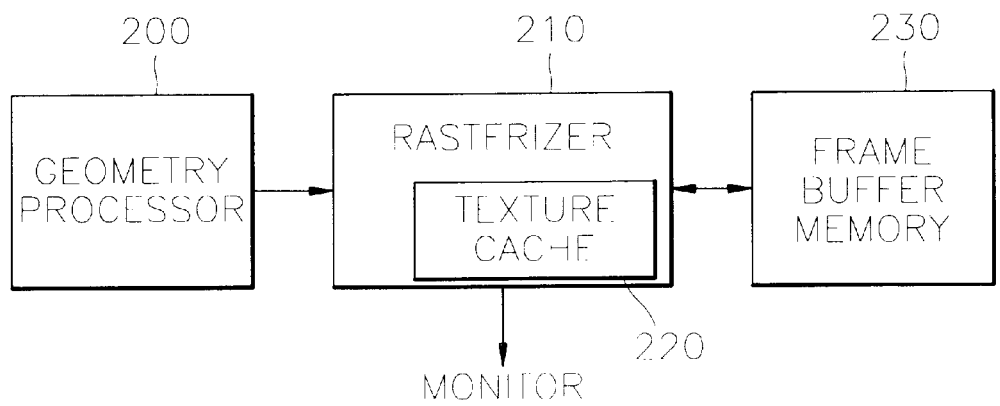
FIG. 2 shows a texture mapping system according to the present invention.

Referring to FIG. 2, a texture mapping system includes a geometry processor 200, a rasterizer 210, a texture cache 220 and a frame buffer memory 230. The geometry processor 200 calculates changes of geometric information on an object to be rendered as a unit of a polygon, and converts the result to be projected on a screen of a monitor. The rasterizer 210 calculates a parameter necessary for rasterization from the projected polygons and generates pixel values in the polygon using the parameter. The frame buffer memory 230 stores data with respect to intensity values of each pixel forming an image. The texture cache 220 stores texture image data fetched from the frame buffer memory 230 by the rasterizer 210 during texture mapping with respect to an image covering one scanline. The texture cache 220, which is a typical cache memory, determines whether the texture image data used for the texture mapping of a previous scanline includes texture image data to be used for current scanline texture mapping. When the texture image data, stored in the texture cache 220, which is fetched from frame buffer memory 230 in texture mapping of a previous scanline, includes data to be used for current scanline texture mapping, the cache hit occurs, to thereby increase a data access speed, however, when the cache miss occurs, corresponding texture image data is read from the frame buffer memory 230 to be stored in the texture cache 220.

Figures 3, 4:
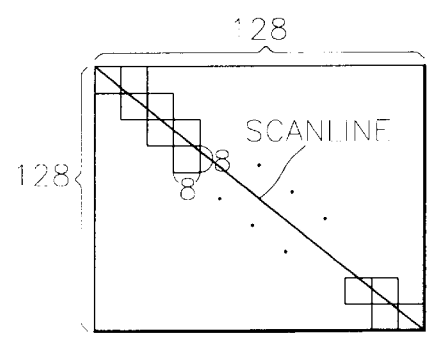
FIG. 3 shows a structure of a texture cache according to the present invention.
FIG. 4 shows a texture image for illustrating the present invention.

FIG. 3 shows a structure of the texture cache 220 according to the present invention, and the texture cache 220 is composed of a first effective bit region 300, a second effective bit region 301, a tag region 310 and a refill region 320.

The first effective bit region 300 stores data indicating whether texture image fetch data of the corresponding refill region was used for texture mapping with respect to the previous scanline. For example, when 'a first effective bit 0' of FIG. 3 is set, it indicates that the texture image fetch data stored in 'a refill 0' was used for the previous scanline texture mapping. When 'a first effective bit 2' is reset, it indicates that the texture image fetch data stored in 'a refill 2' was not used for the previous scanline texture mapping.

The second effective bit region 301 stores data indicating whether the texture image fetch data stored in the corresponding refill line region 320 is used for current scanline texture mapping. When the current scanline texture mapping is completed, the data stored in the second effective bit region 301 is shifted to the first effective bit region 300 and thereafter is reset.

The first and second effective bit regions 300 and 301 for managing the cache memory to generate maximum cache hit in texture mapping with respect to a next scanline, may reduce a time for fetching texel data of the frame buffer memory 230 to the texture cache 220 and times therefor. The data of the refill line in which the first effective bit is set, may be accessed again in texture mapping of the current scanline. That is, possibility of the cache hit may be increased. However, since data of the refill line in which the first effective bit of a corresponding row is reset, is not used for the texture mapping of the previous scanline, there is no possibility of the cache hit occurring. Accordingly, the texture cache 220 is updated by new data read from the frame buffer memory 230. In other words, data of whether data of the corresponding refill line region was used for the previous scanline texture mapping, is stored in the first effective bit region 300. The data stored in the first effective bit region 300 determines whether new data is updated to the refill line region of a corresponding line during texture mapping of the current scanline. The data indicating whether data of the refill line region is used for the texture mapping of the current scanline, is stored in the second effective bit region 301 and all data of the second effective bit region 301 are shifted to the first effective bit region 300 right just before the next scanline texture mapping begins. Then, the second effective bit region 301 is reset.

The image coordinate (u, v) of the texture data is stored in the tag region 310. The coordinate (u, v) calculated for the scanline texture mapping is compared to the coordinate (u, v) stored in the tag region, to thereby determine whether the texture data corresponding to the coordinate (u, v) calculated for the scanline texture mapping exists in the texture cache 220. Here, the calculated value (u, v) is simultaneously compared to all data of the tag region 310. When the texture cache 220 includes the image coordinate value calculated for the texture mapping, the cache hit occurs, and when not, the cache miss occurs. In the cache miss, data of the frame buffer memory 230 is read to texture cache in a patch unit.

The number of bits of the tag depends on a screen resolution of an application and an image compression method. For example, when a size of the texture image is 1280×1024, the number of bits composing the coordinate (u, v) are 11 and 10, respectively. At this time, when the texture image is compressed using JPEG method, 8×8 pixels are compressed to one block package to be stored in the refill line region 320 of the texture cache of FIG. 2. Accordingly, the number of bits of an address indicating one data patch are 8 and 7 obtained by subtracting LSB 3 bits from the 11 and 10, respectively, and the number of the bits of the tag data (or coordinates of u, v) stored in the tag region is 15 obtained by adding the 8 and 7.

The refill line region 320 stores texture image patch data corresponding to an image coordinate of the tag region. A size of one refill line is determined by the compression method and bits per pixel (bpp) according to information on color of a texel and transparency.

Referring to FIG. 4, a size of a texture image is 128×128. When the bpp is 16 bits and the compression is performed by a JPEG method, 32 patch data are required for covering one scanline. Accordingly, memory capacity for storing 32 or more texel data of 8×8×16 is required. In the image of FIG. 4, maximum 32 patch data are required for texture mapping, regardless of a scan direction with respect to an overall texture image of 128×128×16. For example, in FIG. 4, the scanline extends over a portion covering maximum length of the image and 16×2 patch data is aligned along the scanline. As described in FIG. 3, the texture image patch data used for texture-mapping of the previous scanline are still stored in the texture cache without being refreshed, so that when cache miss occurs in texture-mapping of the current scanline, a space for storing new data may be deficient. Accordingly, a memory space must be larger than a space for storing the number of maximum patch data required for texture-mapping of one scanline. Considering the number of patch data covering one scanline and the number of patch data shared with the scanline neighboring thereto (i.e., the number of patch data which need not be stored by external access due to cache hit), a half of the number of the maximum patch data may be further required for a space of the texture cache 220. The number of lines or rows of the texture cache with respect to the image of FIG. 4 is 48, which is 1.5 times the number of maximum patch data, to thereby require a memory of approximately 6 KB for the texture cache 220.

The conventional texture memory for texture-mapping the image of FIG. 4 requires capacity for storing data of 65536 pixels. Meanwhile, the texture cache of FIG. 2 requires only capacity for storing data of 8×8×48, i.e., 3072 pixels at most, where 8×8 is patch data and 48 is the number of refill lines. This shows that the capacity of the texture cache of the rasterizer is reduced to 4.68% for the conventional texture memory capacity.

Figure 5:
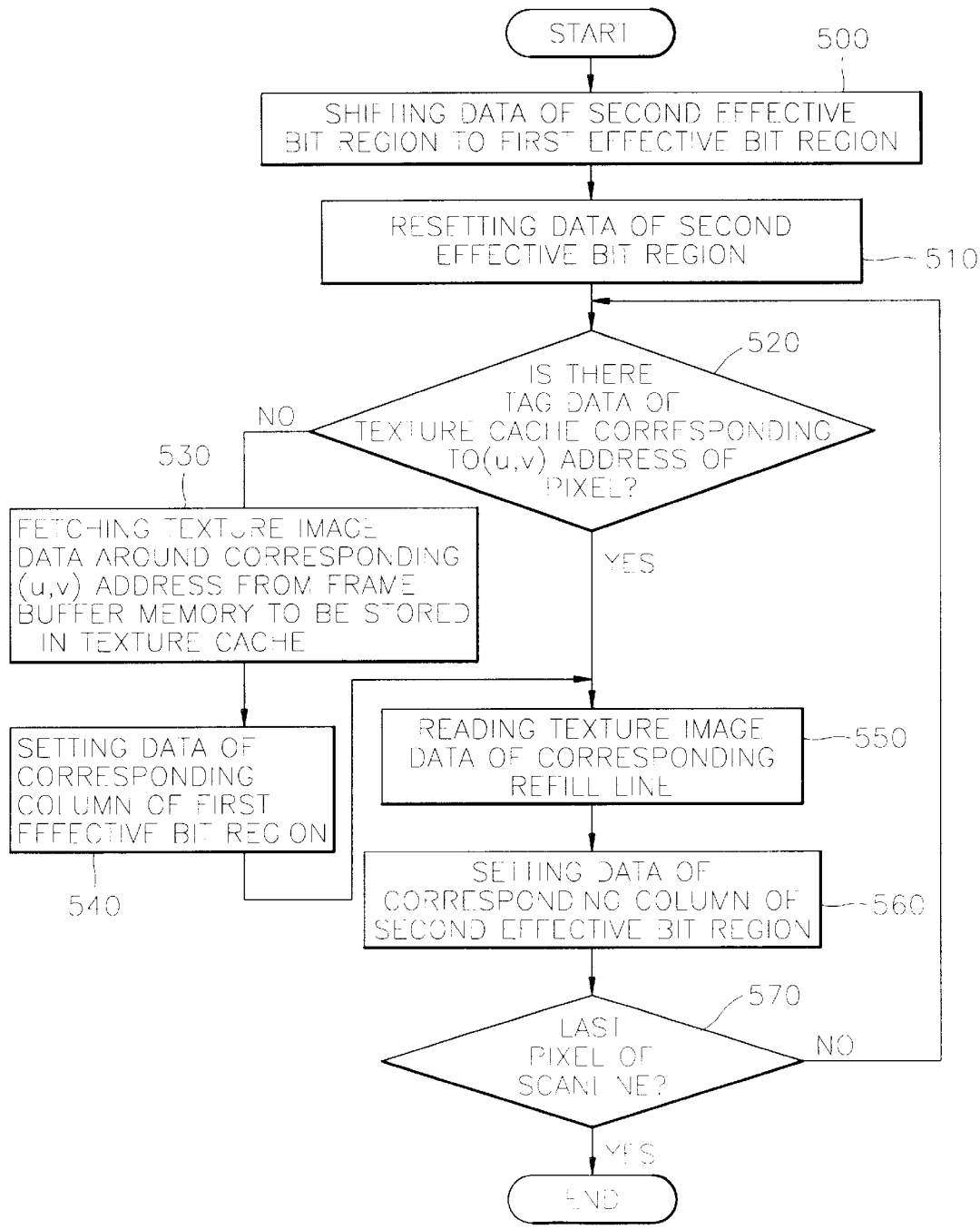
FIG. 5 is a flowchart of a texture mapping method according to the present invention.

In FIG. 5, when a new scanline begins, data of the second effective bit region 301 is shifted to the first effective bit region 300 (step 500). The data of the second effective bit region 301 is reset (step 501). It is determined whether (u, v) address of a pixel included in the current scanline exists in the tag region 310 of the texture cache (step 520). When there is not corresponding (u, v) address, texture image patch data around the (u, v) address is read from an external memory, i.e., the frame buffer memory 230 of FIG. 2 to store the data in the refill line region 320 of a row where data of the first effective bit region 300 is reset (step 530). The data of a corresponding row in the first effective bit region is set as '1' (step 540). When there is the (u, v) address in the tag region in the step 520 or after the step 530 is performed, values of the texture image patch data of the refill line region 320 of the corresponding row are read (step 550), and data of the corresponding second effective bit region 301 is set (step 560). It is determined whether the pixel to be texture mapped is a last pixel (step 570). If the pixel is last one, texture mapping data access of the current scanline is completed, and if not, the process is repeatedly performed from the step 520.

According to the texture mapping system including a texture cache and a data loading method of the texture cache of the present invention, texture memory capacity of the graphic process chip is reduced, to thereby reduce chip cost, and a data access time is tremendously reduced due to cache hit, to thereby rapidly perform texture-mapping.

What is claimed is:

1. A texture mapping system for generating pixels displayed on a screen by texture mapping, comprising a texture cache for storing texture image data fetched from a frame buffer memory with respect to one scanline, said texture cache comprising:

a column structure including a tag region for storing an image coordinate value (u,v) of the texture image data, a refill line region for storing texture image data corresponding to the image coordinate value of the tag region, and an effective bit region for storing data indicating whether data of the refill line region is used for scanline texture mapping; and a row structure for storing texture image patch data to be texture mapped, wherein said row structure has a number rows which is equal to the number of texture image patch data with respect to an image of a maximum length covering at least one scanline to be texture mapped.

2. The system of claim 1, wherein the row structure has a number of rows which is 1.5 times the number of maximum texture image patch data corresponding to one scanline to be texture mapped.

3. The system of claim 1, wherein in the refill line region, capacity of one line is determined by a data compression method and a number of bits per pixel (bpp) indicating color and transparency of a texel, and texel data around the image coordinate is stored in each line.

4. The system of claim 1, wherein the effective bit region comprises:

a first effective bit region for storing data indicating whether texture image patch data of the refill line region is used for previous scanline texture mapping; and a second effective bit region for storing data indicating whether texture image patch data of the refill line region is used for the current scanline texture mapping, and shifting the stored data to the first effective bit region after completion of the current scanline texture mapping.

5. A texture mapping method using texture cache for storing texture image data received from a frame buffer memory to be texture mapped with respect to one scanline image, the method comprising the steps of:

(a) shifting data stored in a second effective bit region of the texture cache, which indicates whether texture image patch data stored in a corresponding texture cache line was used for previous scanline texture mapping, to a first effective bit region in the texture cache and resetting the data of the second effective bit region when texture mapping of a new scanline begins;

(b) determining whether a tag region of the texture cache for storing an image coordinate (u,v) of texel data to be texture mapped contains an address which is same as a (u,v) address generated with respect to one image of a current scanline;

(c) reading texture image patch data around the (u,v) address from the frame memory buffer and storing the texture image patch data in the refill line region where the data of the first effective bit region is reset, if it is determined in step (b) that the tag region does not contain an address which is same as the (u,v) address generated with respect to one image of a current scanline;

(d) reading values of the texture image patch data of the corresponding refill line region and setting data of the second effective bit region of the corresponding line, if it is determined in step (b) that the tag region contains an address same as the (u,v) address generated with respect to one image of the current scanline or after step (c) is performed; and e) completing texture mapping data access of the current scanline if a pixel to be texture mapped is a last pixel of the current scanline, and repeatedly performing step (b) if the pixel to be texture mapped is not the last pixel of the current scanline.

6. A texture mapping system comprising:

a geometry processor for calculating changes of geometric information on an object to be rendered in a polygon unit, and converting the result to be projected on a screen of a monitor;

a frame buffer memory for storing data corresponding to intensity values of each pixel forming an image;

a texture cache comprising a column structure having a tag region for storing an image coordinate value (u, v) of the texture image data, a refill line region for storing texture image data corresponding to the image coordinate value of the tag region, and an effective bit region for storing data indicating whether data of the refill line region is used for scanline texture mapping, and a row structure for storing texture image patch data to be texture mapped, wherein said row structure has a number rows which is equal to the number of texture image patch data with respect to an image of a maximum length covering at least one scanline to be texture mapped; and a rasterizer for performing rasterization using a signal generated by the geometry processor and the texture image patch data read from the texture cache.

* * * * *